(No Model.) 2 Sheets—Sheet 2.
J. P. BLACK.
CULTIVATOR.
No. 313,847. Patented Mar. 17, 1885.
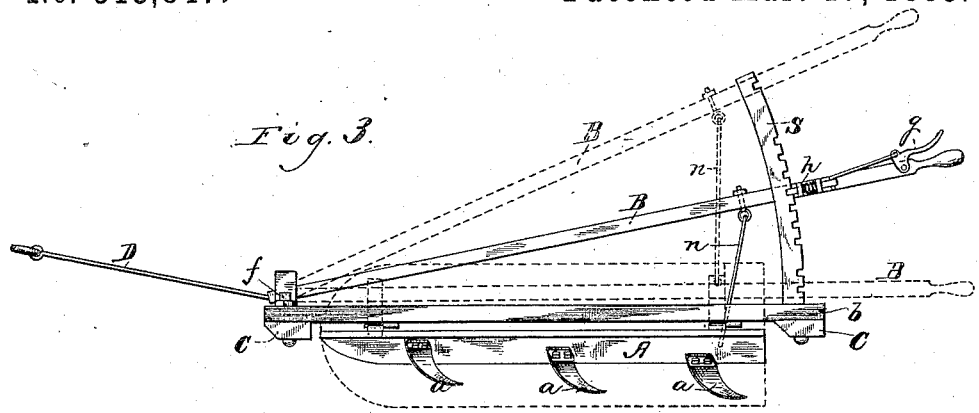
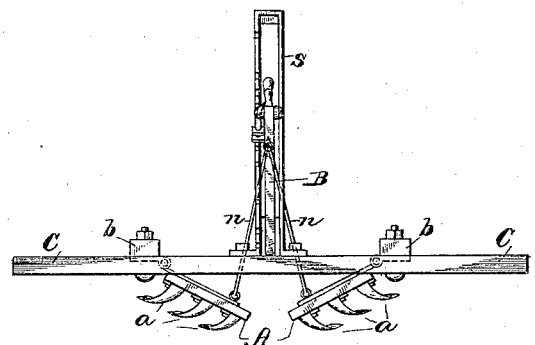
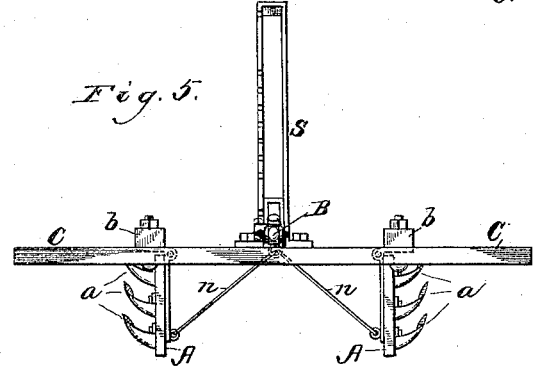
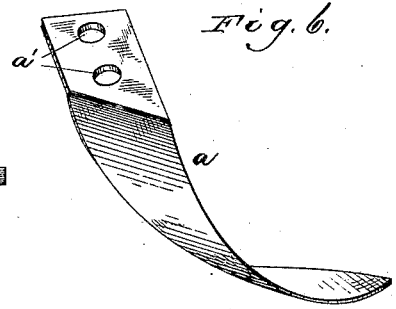
Witnesses.
Henry Faulkner,
Sam. B. Dover.
Inventor.
Joseph P. Black,
By John Lane,
his Attorney.

(No Model.) 2 Sheets—Sheet 1.
J. P. BLACK.
CULTIVATOR.
No. 313,847. Patented Mar. 17, 1885.
Fig. 1.
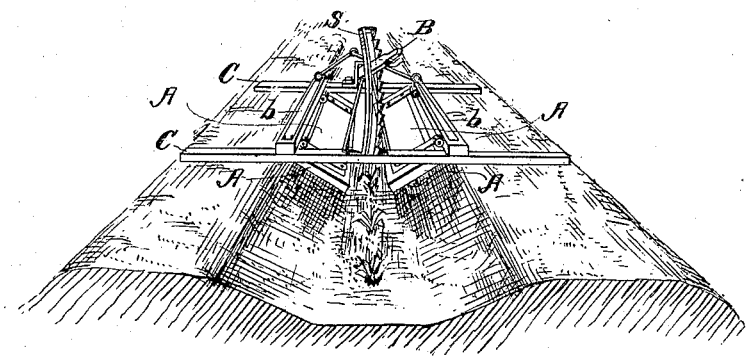
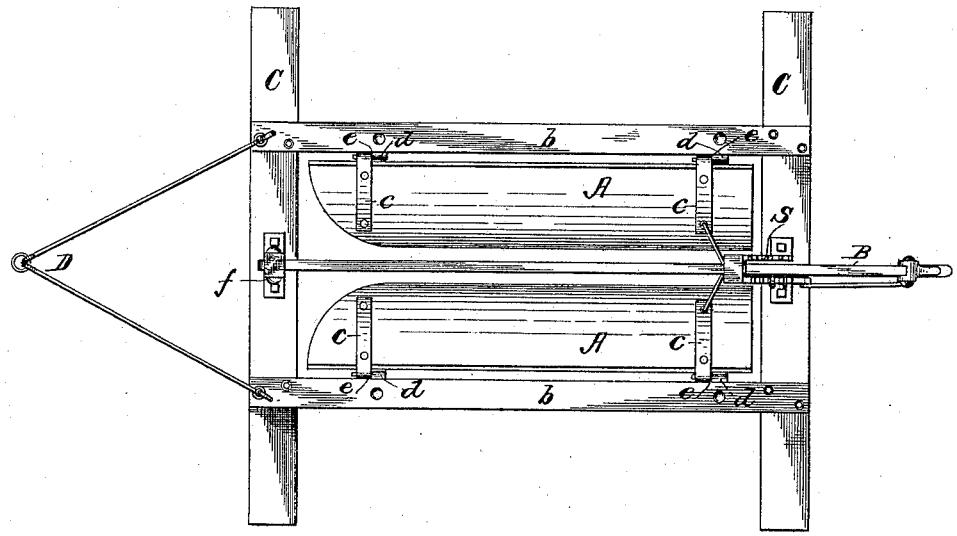
Fig. 2.
Witnesses.
Henry Faulkner
Sam'l B. Dover.
Inventor.
Joseph P. Black,
By John Lane,
his Attorney.
N. PETERS, Photo-Lithographer, Washington, D. C.

UNITED STATES PATENT OFFICE.

JOSEPH P. BLACK, OF ALTON, ILLINOIS, ASSIGNOR TO HAPGOOD PLOW COMPANY, OF SAME PLACE.

CULTIVATOR.

SPECIFICATION forming part of Letters Patent No. 313,847, dated March 17, 1885.

Application filed November 20, 1884. (No model.)

*To all whom it may concern:*

Be it known that I, JOSEPH P. BLACK, a citizen of the United States, residing at Alton, in the county of Madison and State of Illinois, have invented a new and useful Improvement in Listing-Cultivators, of which the following is a specification.

My invention relates to that class of cultivators used in cultivating corn planted by a listing plow or planter in a valley between ridges; and the improvement consists, first, in providing the cultivator with two inwardly swinging or hinged plank provided with blades or teeth, and connected by a hinged joint to the frame and also connected to an adjusting-lever; second, in certain other improvements and combinations, all of which will first be described and shown, and afterwards specially pointed out in the claims.

Referring to the drawings, like letters refer to like parts in all the figures, in which Figure 1 is a perspective view, reduced, of a listing-cultivator embodying my invention. Fig. 2 is a plan or top view showing the swinging plank A, and how they are hinged to the sides of the frame. Fig. 3 is a side elevation view showing by dotted lines how the swinging plank A may be turned downward as runners, or turned upward above the frame in elevating the blades or teeth above the ground. Fig. 4 is a rear view showing the swinging plank A in position for work and how connected to the adjusting-lever. Fig. 5 is also a rear view showing as when the swinging plank A are turned down as runners for turning corners and elevating the blades or teeth out of the ground. Fig. 6 is a perspective view, enlarged, of one of the blades *a*, showing as I preferably make them.

The frame may consist of the two cross-plank C, with ends extending to ride upon the ridges, and two side bars, *b*, bolted to the top of said cross-plank and with draft-rod D, as in ordinary use. Both side bars, *b*, are provided with a swinging plank A, swinging inwardly, and having blades or teeth *a* to stir the soil, and in connection therewith the lever B, for adjusting the said plank and blades or teeth to work in deep or shallow valleys, and also serving as a handle for lifting or guiding the cultivator.

The swinging plank A may preferably consist of plank-lumber two inches thick by ten inches wide and four feet long, (more or less,) and one corner of the front end may be rounded as a sled-runner, as shown in the drawings.

*c* and *d* represent an ordinary strap and hook hinge, the former bolted to the top of the swinging plank A, and the latter bolted to the side bar, *b*, by which said swinging plank have their outer edges connected to the bars *b* by a hinged joint, *e*, as shown in the drawings.

The under side of the swinging plank A is provided with blades or teeth *a*. I preferably use three blades with each said plank, and of the form and construction shown in Fig. 6, which may consist of a thin flat bar of steel with a thin sharp front edge sloping rearward to obviate the gathering of trash and sods, and curved and twisted outward for stirring and moving the soil outward, and the top end of said blade bent forward and provided with perforations *a'* for attachment to the plank with bolts, as shown.

Any other construction of the blades, or harrow teeth, and more or less in number, may be used without departing from my invention.

The lever B has its front end connected pivotally on the front cross-plank C by means of an eyebolt or pin, *f*, the rear end of said lever provided with a thumb-latch, *g*, and lock *h*, to catch and lock into the notched standard S, attached to the rear cross-plank C and the rods or links *n n*, connecting to the said lever and to the inner edge of the swinging plank A, as shown in the drawings.

In operation, the operator moves the lever B up or down, swinging the said plank A up or down, as desired, and locking them in any desired position by the lock *h* catching into the notches of the standard S, and when the lever is locked to the standard then said lever may serve as a handle by which the operator may lift or guide the cultivator, as will be understood by the drawings. In Fig. 1 is shown the cultivator in position as working, the ends of the cross-plank C riding the tops of the ridges, the swinging plank A riding the sloping sides of the ridges, and the blades thereunder stirring the soil upon both sides of the row of corn. It will be observed that as the swinging plank A are in contact with the soil riding the sloping sides of the ridges, thereby acting as shields in protecting the small plants from falling clods and sods, the use of separate shields is avoided. When the cultivator arrives at the end of the row, the operator may unlock said lever and swing the plank A upward above the frame, carrying the blades out of the ground, as is shown in Fig. 3, and the operator may swing said plank A downward, as shown in Fig. 5, by which the blades are moved out of the ground as before, and said plank A turned downward as sled-runners, on which the machine may be transported from field to field, and for turning corners or changing from one row to another row, and by means of using the said lever B as a handle the operator may locate the cultivator directly over the row of corn before dropping said plank A and blades into working position with less liability of uprooting corn than heretofore.

The blade $a$, as shown, is simple and inexpensive, sloping rearwardly to avoid gathering trash, twisted and curved to better stir the soil, and with its top end bent over is more substantial and better adapted to be attached to the plank than heretofore.

Having thus set forth my invention, I will now point out what I claim.

1. In a listing-cultivator, in combination with the center and side beams, two swinging plank swinging inwardly, provided with blades or teeth and a hinged joint connection to the side bars of the frame, in combination with the adjusting-lever connected with and adapted to swing said plank, substantially as and for the purpose set forth.

2. In a listing-cultivator, two swinging plank swinging inwardly and downwardly from the outside beams provided with blades or teeth and a hinged joint and adapted to be used as sled-runners on which to transport the machine, in combination with a lever adapted to swing said plank, substantially as and for the purpose set forth.

3. In a listing-cultivator, two swinging plank swinging inwardly provided with blades or teeth, a hinged joint connecting to the side bars of the frame, said plank adapted to be swung upward to elevate said blades or teeth above the ground, in combination with a lever adapted to swing said plank, substantially as and for the purpose set forth.

4. In a listing-cultivator, the lever B, provided with the lock, in combination with the frame and the two swinging plank provided with blades or teeth, said lever adapted to swing and adjust said plank, and serving as a handle by which the operator may lift and guide the cultivator, substantially as specified.

5. The combination of the frame, the two swinging plank A, provided with blades or teeth $a$, hinged joint $e$, lever B, standard S, rods or links $n\ n$, and draft-rod D, substantially as and for the purpose set forth.

JOSEPH P. BLACK.

Witnesses:
WM. R. PINCKARD,
CHAS. S. PHILIPS.